(No Model.) 8 Sheets—Sheet 1.
M. V. B. ETHRIDGE.
MACHINE FOR STAMP CANCELING AND POST MARKING.

No. 323,799. Patented Aug. 4, 1885.

Fig. 1.

Attest:
F. H. Schott
Fred E. Tasker

Inventor:
Martin V. B. Ethridge.
Per John C. Tasker atty

Fig. 2.

(No Model.) 8 Sheets—Sheet 6.

M. V. B. ETHRIDGE.
MACHINE FOR STAMP CANCELING AND POST MARKING.

No. 323,799. Patented Aug. 4, 1885.

Attest:
F. H. Schott
Fred E. Tasker.

Inventor:
Martin V. B. Ethridge,
per John C. Tasker atty.

(No Model.) 8 Sheets—Sheet 7.

M. V. B. ETHRIDGE.
MACHINE FOR STAMP CANCELING AND POST MARKING.

No. 323,799. Patented Aug. 4, 1885.

(No Model.) 8 Sheets—Sheet 8.

M. V. B. ETHRIDGE.
MACHINE FOR STAMP CANCELING AND POST MARKING.

No. 323,799. Patented Aug. 4, 1885.

Attest:
F. H. Schott
Fred E. Tasker.

Inventor:
Martin V. B. Ethridge
by John C. Tasker atty

UNITED STATES PATENT OFFICE.

MARTIN V. B. ETHRIDGE, OF BOSTON, MASSACHUSETTS, ASSIGNOR TO ANDREW J. BAILEY, OF SAME PLACE.

MACHINE FOR STAMP-CANCELING AND POSTMARKING.

SPECIFICATION forming part of Letters Patent No. 323,799, dated August 4, 1885.

Application filed July 3, 1885. (No model.) Patented in Belgium April 28, 1885, No. 68,681.

*To all whom it may concern:*

Be it known that I, MARTIN V. B. ETHRIDGE, a citizen of the United States, residing at Boston, in the county of Suffolk and State of Massachusetts, have invented certain new and useful Improvements in Machines for Stamp-Canceling and Postmarking Mail Matter; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to stamp-canceling and postmarking letters, postal-cards, and other mail matter, and delivering the same for sorting and distribution to the mails by one continuous series of appropriate mechanical operations, whereby the letters, cards, &c., are automatically adjusted, timed, carried through an automatically-adjustable canceling and marking mechanism, and propelled to the "sorting-table," whence they are distributed according to destination.

Heretofore machinery for postmarking and stamp-canceling letters of various dimensions has not been practical, for the reason, among others, that when the letters are fed by hand directly to the canceling and marking devices the operation of stamping is not so rapid and unfailing as that attained by the use of a hand-stamp; and an automatic feed has not hitherto been reliable on account of the great inequalities usual in the size and thickness of letters and their envelopes as found in the mails, and the consequent difficulty of making the mechanism readily and accurately adjustable to the various requirements of the matter to be acted upon. These objections I have succeeded in overcoming, besides effecting a great reduction, as compared with other methods, in the time, labor, and expense of preparing mail matter for distribution and mailing.

My invention involves the "facing" of letters directly into the machine and upon a moving support contained therein, by which each letter is automatically adjusted or aligned. By facing the letters it will be understood that I refer to their being arranged with the attached postage-stamps on each in the same (or approximately the same) relative position. This I do without previously "bunching" the letters into packages, as ordinarily practiced.

The invention also embraces a hopper of peculiar form and position, in which are arranged a pair of traveling bands that constitute the moving support upon which the letters are faced and aligned successively.

The invention further consists in a timing or regulating mechanism that is operated and controlled separately by each letter passing through the machine, a portion of said mechanism being adapted to control the adjustment of the printing-cylinder, all of which is inoperative without the letter, and thereby secures an accurate registry of the postmarking and canceling impression at the proper points and prevents inking or soiling of the letter-support when no letters are passing.

The invention also consists in a cam-movement that packs and propels the postmarked letters from the stamping mechanism to the sorting-table; and, further, in certain peculiarities in the construction and combination of parts, as hereinafter more fully set forth.

In the annexed drawings, illustrating my invention.

Like letters indicate like parts.

Figure 4:
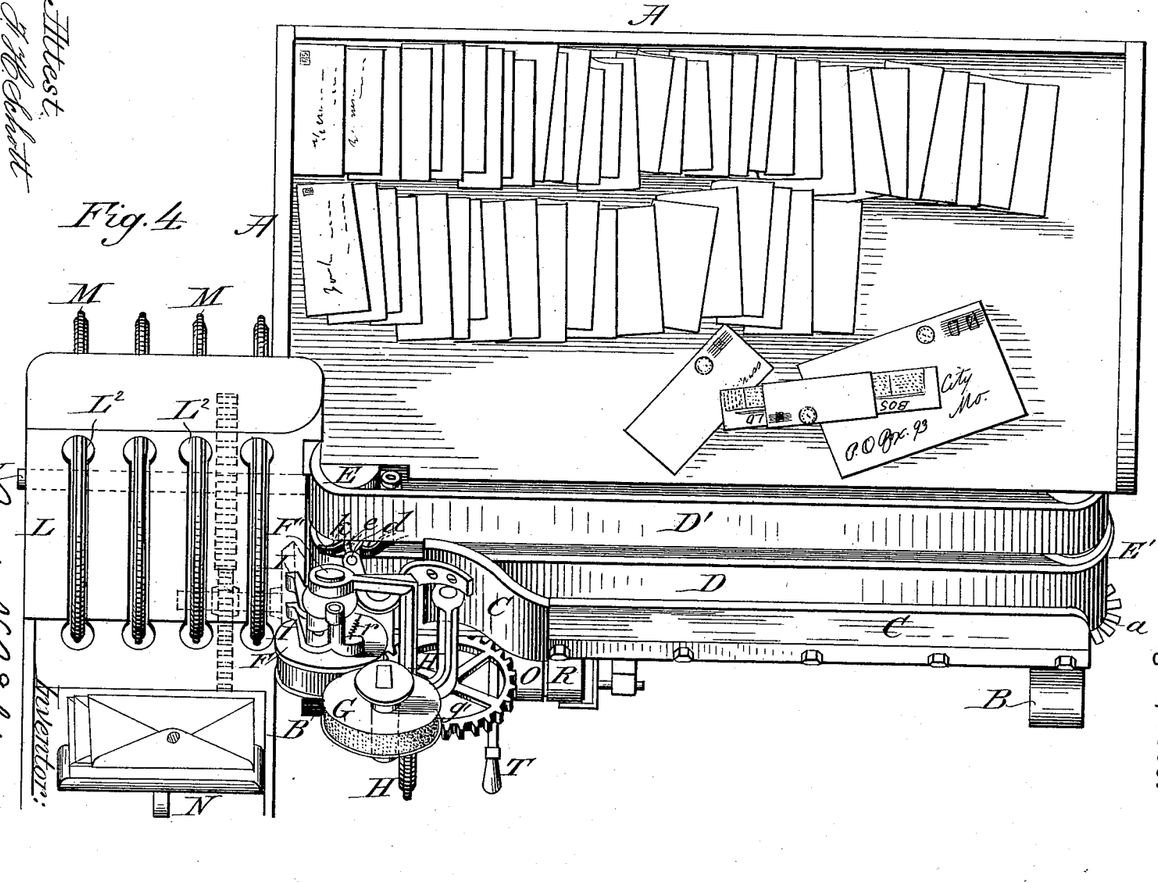
Fig. 4 is a top plan view of the apparatus.

A designates the facing-table, upon which letters, cards, and similar pieces of mail matter are thrown promiscuously, as represented in Fig. 4. This table may form an integral part of the postmarking and stamp-canceling machine, as shown; or the machine and facing-table may be separate structures, if desired.

The machine proper comprises a suitable frame, B, which supports an inclined hopper, C, into which the letters from the facing-table are placed singly or one after another, so as to rest upon an inclined moving support, as D D', that forms a V-shaped angle with the inclined front of the hopper. By this inclined moving support the letters are automatically adjusted and conveyed to the postmarking and stamp-canceling mechanism, their progress being regulated by appropriate mechanism, hereinafter described, which is controlled or actuated by each letter, card, or package consecutively in such a manner as to insure a clear and distinct impression of the postmarking and stamp-canceling dies at the proper points upon the package or its envelope, after which it is delivered to the action of devices by which it is propelled to the sorting-table.

The traveling bands D D', which constitute a moving support for conveying the letters to the postmarking and stamp-canceling mechanism, are mounted on rolls E E', one of which, as E, is located beneath the postmarking and stamp-canceling cylinder F, and serves as a pressure-roll as well as a band-carrying roll or driver. It will be seen that the traveling bands and their carrying-rolls are arranged in an inclined position, as are also the printing-cylinder F and its accompaniments, the letters, cards, and other packages, though of varying width, being thus caused to assume by gravity a uniform position upon the conveying-bands. The lower or forward inclined band, D, is provided on its lower or forward edge with a series of projections or shoulders, $a\ a$, by which the letters are adjusted and supported in a uniform position or alignment. When the bands D D' are in motion, these projections $a\ a$ are caused to move beneath and nearly in contact with an inwardly-projecting lip, ledge, or flange, $b$, that extends longitudinally and in a horizontally-inclined position within the hopper C to prevent the letters from being caught by getting over the shouldered projections on the lower band.

The letter, card, or newspaper package is conveyed by the bands D D' without friction beneath a tension device that consists of a spring-guide or pressure-arm, $c$, and then over a letter-elevating spring or guide, $d$, the latter being arranged to project upward between the conveying-bands. In this manner the letter or similar package, without regard to its thickness, is guided surely to a yielding timing-lever, $e$, that is pivoted to a suitable support and provided with a spring, $f$, Fig. 9, by which it is returned to its depending position after the letter has passed. The devices here referred to are clearly illustrated in Figs. 6, 7, and 8, which show a piece of mail matter in various stages of its progress toward and through the postmarking and stamp-canceling mechanism. It will be understood that each letter is stopped at its forward end by the timing-lever $e$, and that the letter remains in that position until the rotation of the type-cylinder F has brought its type and canceling dies nearly to the point where their impression is to be made.

Figure 5:
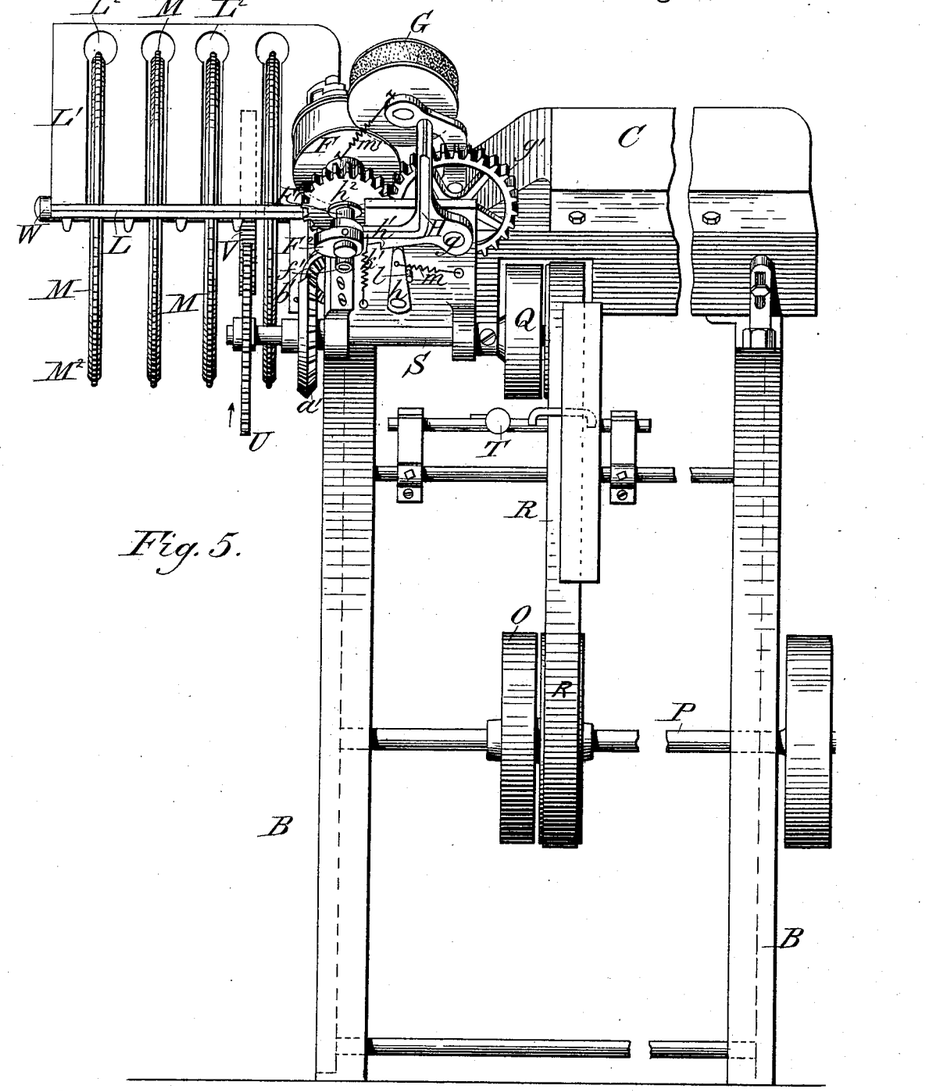
Fig. 5 is a front elevation of the same.

The postmarking-cylinder F and the inking-roll G are respectively mounted in a rocker-frame, H, and a rocker-arm, H', that are fulcrumed at $g$ upon a suitable shaft. In order to prevent the cylinder F from bearing on and soiling the bands D D' when no mail matter is passing, means are provided for automatically supporting the rocker-frame and its attached mechanism away from the traveling bands D D' until the letter, card, or package is about to pass. This is accomplished by an oscillatory lug or post, $h$, that is capable of fitting a notch, $h'$, in the under portion of said rocker-frame. The lug or post $h$ is supported on one end of a rock-shaft, $i$, which carries at its other end a controlling-lever arm, $k$, that projects up between the bands D D' and beneath the postmarking-cylinder. This controlling-lever $k$ is depressed by the letter or other mail matter as it begins to pass beneath the cylinder, (see Figs. 7 and 8,) thus imparting a partial rotation to the rock-shaft $i$ and moving the lug $h$ forward until its end enters the notch $h'$, thereby lowering the rocker-frame and bringing the cylinder F in printing contact with the letter or card under the contractile force of a spring, $k'$, that extends between the rocker-frame and the main frame of the machine. While the cylinder and its supporting-frame remain elevated the lug $h$ is held back out of the notch $h'$, and against a stop or stud, $l$, by a spiral spring, $m$, Fig. 5. The postmarking-cylinder F is mounted rigidly on a shaft, F', which also carries a cam, $F^2$, that bears against a small roll, $f'$, on a stud or projection fixed to the main frame of the machine. After the letter is marked and canceled the continued rotation of the cylinder F and cam F² brings the point of the cam in contact with the friction-roll $f'$, and thereby raises the rocker-frame H, thus tripping the lug $h$, which, together with the controlling-lever $k$, flies back under the tension of the spring $m$, and so supports the rocker-frame and attached printing-cylinder away from the traveling bands until the passage of another piece of mail matter again depresses the controlling-lever $k$ and causes the printing-cylinder to descend.

Figure 6:
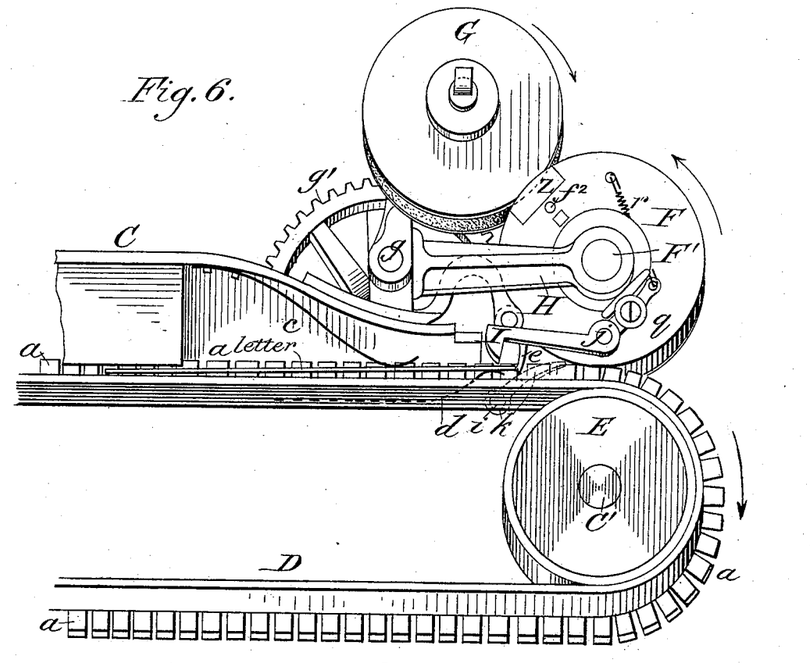
Fig. 6 is a rear elevation of the inking-roll, the impression-roll, and the type-cylinder with its controlling mechanism which is actuated by the letter, card, or paper about to be postmarked, said type-cylinder being shown as revolving free from the feeding-bands or moving support on which rests a letter in contact with the timing-lever.
Figure 7:
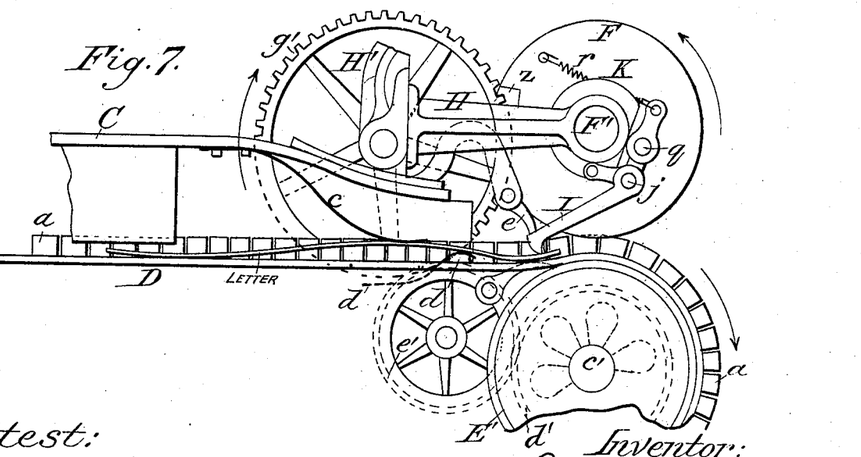
Fig. 7 is a rear elevation of the type-cylinder and accompanying mechanism, showing the position of the letter as it commences its passage between the type-cylinder and impression-roll.
Figure 8:
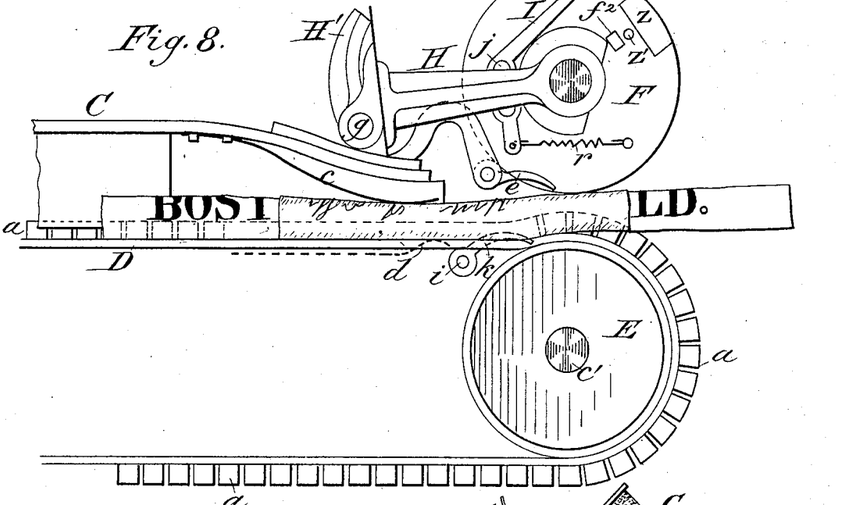
Fig. 8 is also a rear elevation of the impression-roll and type-cylinder, showing the controlling mechanism actuated by a folded newspaper that is being postmarked.
Figure 9:
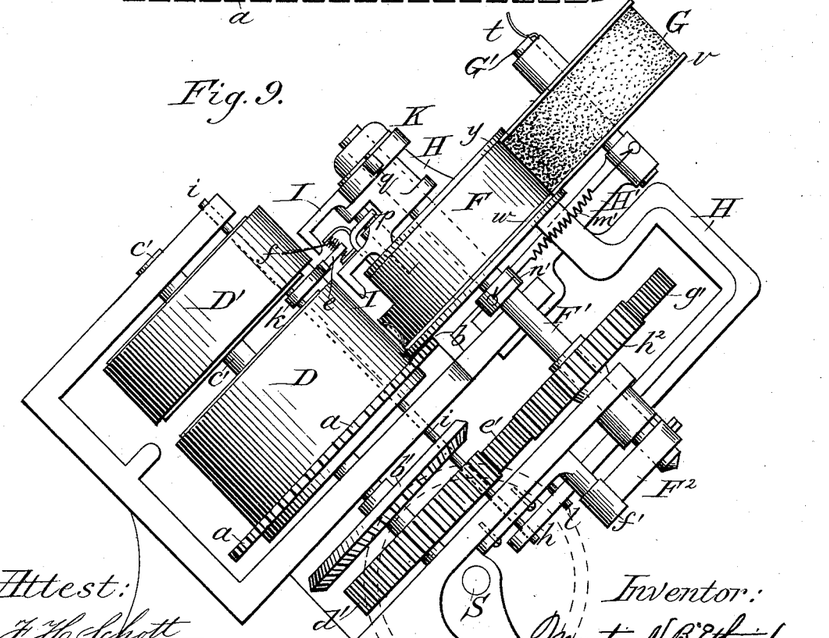
Fig. 9 is an enlarged left end elevation of the impression, type, and inking cylinders, with their actuating mechanism, the clamping-feet, feeding-bands, and accompaniments.

The letter, card, newspaper package, or other similar piece of mail matter is propelled past the timing-lever $e$ by means of yielding clamping-feet I I, that are pivoted at $j$ to the rear side of the postmarking-cylinder F, as shown in Fig. 6, or to a step or bearing, $p$, attached to said cylinder, as shown in Figs. 7 and 9. These clamping-feet are arranged to revolve, one on each side of the levers $e$ and $k$, so as to exert at proper intervals a suitable pressure and traction on the letters, cards, &c., that are brought to the timing-lever $e$ by the traveling bands. The drawing pressure exerted upon the letter by the clamping-feet I I is sufficient to cause the letter to push the timing-lever $e$ upward and out of its path, the letter or like package being prevented from rebounding by the forwardly-depending guide or pressure-arm $c$, before described. By means of the rotary clamping-feet I I, the letters, cards, and like pieces of mail matter, after being respectively timed by the lever $e$, are consecutively carried over the controlling-lever $k$, thereby depressing the same and actuating the mechanism that lowers the cylinder F in season to properly execute its functions, as before explained.

On the upper end of the casting that forms the body of the clamping-feet I I is a stud that carries a small roll, $q$, which acts in conjunction with a stationary cam, K, on the rocker-frame H, the roll $q$ being held in contact with the cam by a spring, $h$, one end of which is fastened to the body of the clamping-feet and the other end to the printing or postmarking cylinder. The stationary cam K is so shaped that the clamping-feet I I are allowed to project beyond the circumference of the cylinder F during a portion of its rotation, and dropped at the proper time on the letter, card, or package at the timing-lever with sufficient force to overcome the resistance of said lever. This is accomplished by spring $r$ drawing the roll $q$ past or in contact with the depressed side of the cam K; but after the forward end of the letter has been carried by the moving support or bands D D′ between the cylinder F and pressure-roll E, the continued rotation of the cylinder draws the roll $q$ over the high portion of the stationary cam K, and so retracts the clamping-feet within a circle that corresponds to the periphery of the printing or postmarking cylinder. At the instant that the clamping-feet I I carry the package over the controlling-lever $k$, thereby depressing the same, the rocker-frame H is lifted off the lug or post $p$ by the cam F² and allowed to fall, together with the printing-cylinder. These movements are so timed that when the cylinder F falls onto a letter, card, or package the postmarking and canceling dies will be in such position as to make their impression at the proper points.

By the momentum of the cylinder F and the pressure-roll E with its traveling bands D D′, the postmarked and canceled packages are deposited rapidly and consecutively upon a narrow elongated table or tray, L, forming a conduit through which the letters, cards, &c., are continuously propelled to the sorting-table, which may be arranged at any convenient point.

Figure 1:
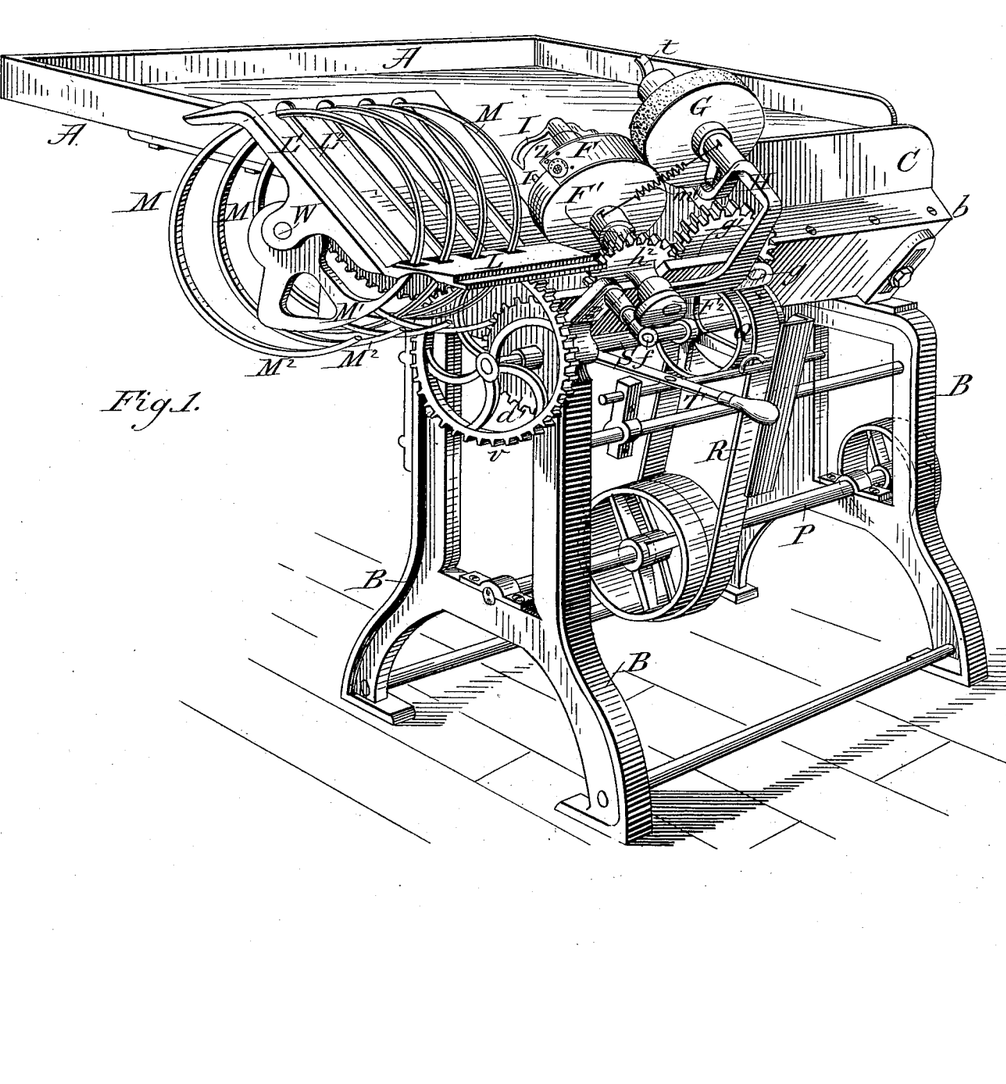
Figure 1 is a perspective view of my improved apparatus for stamp-canceling and postmarking letters, cards, newspapers, and similar mail matter, and for propelling the same to the sorting-table.
Figure 2:
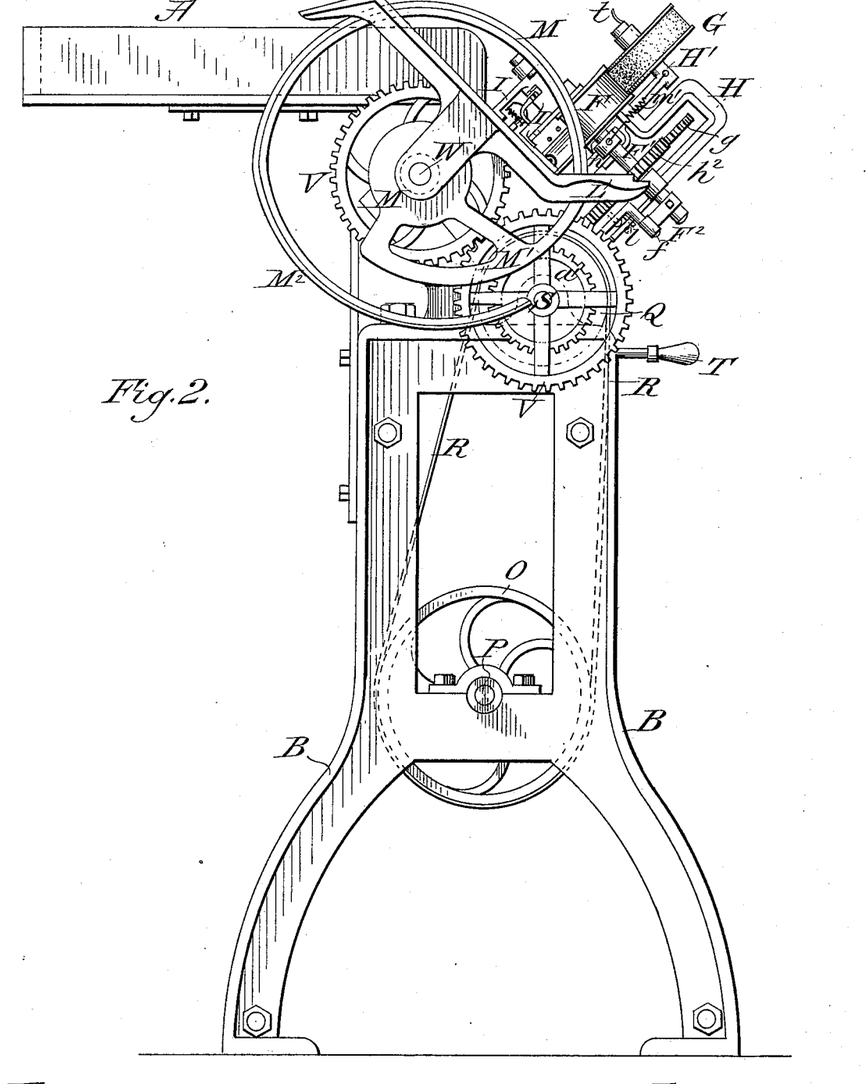
Fig. 2 is a left end elevation of the machine or apparatus.

The rear end of the tray L is formed with an incline, L′, to correspond with the inclination of the printing-cylinder F, as shown in Fig. 2. This incline L′ is provided with vertical slots L² L², Figs. 1 and 5, for the passage of cams M M, that are mounted on a shaft journaled in suitable bearings beneath and behind the incline. The cams M M are each composed of a rigid segmental stock or body, M, from which springs a curved elastic finger, M². The letters, cards, and other pieces of postmarked and canceled mail matter are delivered successively in an inclined edgewise position upon the incline L′, within the space inclosed by the cam-fingers M², which prevent the letters, cards, &c., from falling forward or slipping flat upon the bottom of the tray. It will be seen that as the cams M rotate forward through the slots L² the letter, card, or package resting on or against the incline L′ will be released by the extreme ends of the fingers M² in season to be propelled and packed by the stocks or bodies of the cams in an upright position against a yielding support, N, Fig. 4, that is arranged to move in and along the tray under the pressure of the accumulated letters. This pressure is maintained by the outer faces of the elastic fingers M² as they rotate through the slotted end of the tray. The letters, cards, and other pieces of mail matter deposited in the tray L are thus uniformly packed and propelled steadily and continuously forward to the sorting-table (not shown) for distribution to outgoing mails.

The traveling letter-bands D D′, printing-cylinder F, and cams M M receive motion simultaneously by intermediate gearing from a main shaft, P, that may be driven by any convenient power. On the main shaft P is a fast-and-loose pulley, O, which is connected by belting R, Figs. 1 and 5, with a fast-and-loose pulley, Q, on a counter-shaft, S, a suitable shipping mechanism, as T, being arranged to shift the belt as required.

Figure 3:
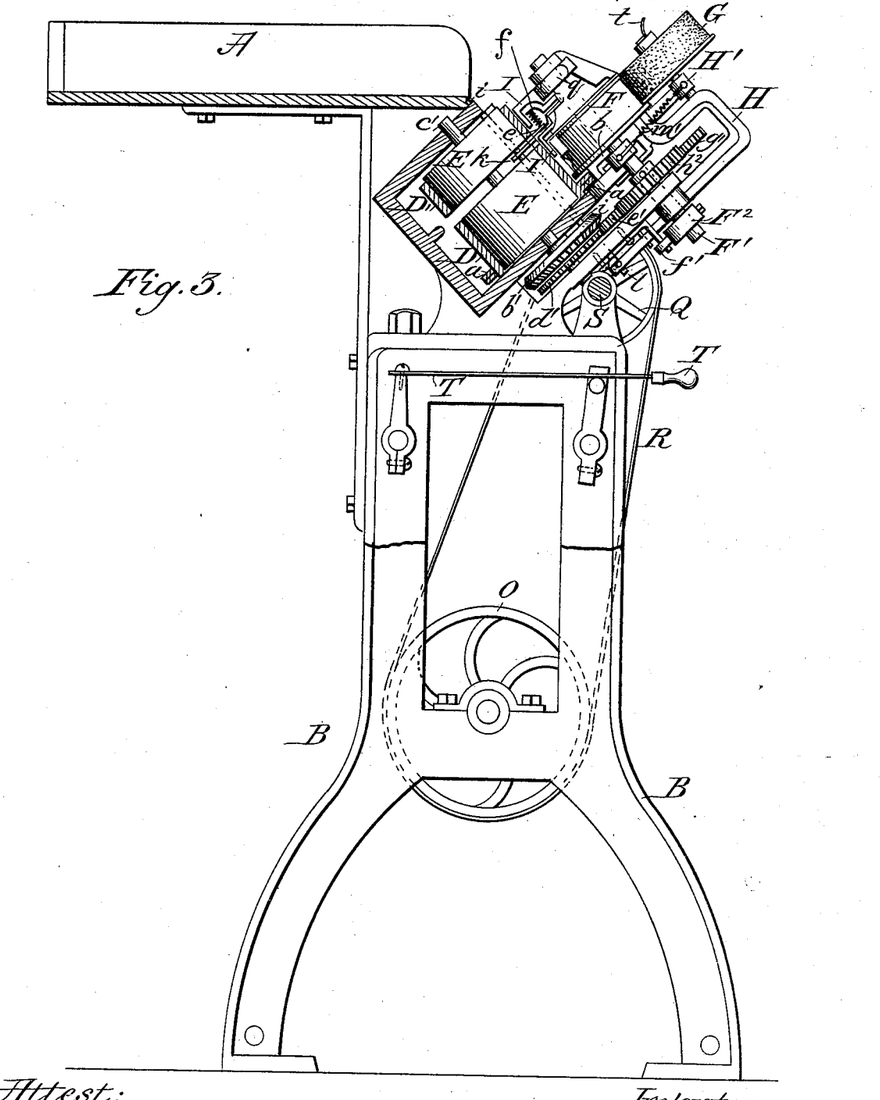
Fig. 3 is a left end elevation of the same, partly in section, with the packing-cams and tray detached.

The shaft S carries a spur-gear, U, that actuates a similar gear, V, on the shaft W, that carries the cams M M for packing and propelling the letters, &c., after they have passed beneath the postmarking-cylinder. On the shaft S is also a bevel-gear, $a'$, that meshes with a bevel-gear, $b'$, Fig. 5, on the shaft of the pressure-roll or band-driver E, by which the letter-carrying bands D D' are moved. The shaft $c'$ of the driver or pressure roll E also carries a spur-gear, $d'$, Fig. 3, that meshes with a pinion, $e'$, mounted on a stud on the main frame of the machine. This pinion drives a gear-wheel, $g'$, which is journaled on a stud attached to the frame of the machine in a suitable position to enable the gear $g'$ to actuate a spur-gear, $h^2$, on the shaft F' of the printing-cylinder F without interfering with the necessary vertical movement of the printing-cylinder and its carrying-frame.

It will be observed that the inking-roll G is mounted loosely on a spindle, G', which is supported by an arm, H', on the shaft of the rocker-frame H, that carries the printing-cylinder F, the inking-roll being rotated by frictional contact with the printing-cylinder, to which it is held by means of a spring, $m'$, which extends from the arm H' to a loose collar, $n'$, on the cylinder-shaft F', as shown in Fig. 9.

The precise form of the rocker-frame H and rocker-arm H' is immaterial. Their purpose is to afford an inclined oscillatory support for the printing-cylinder and the inking-roll, respectively. The forward end of the rocker-frame H supports the shaft F', that carries the printing-cylinder, while the spindle G', on which is mounted the inking-roll, has its support in the rocker-arm H', which is mounted on the same shaft with the rocker-frame.

Figure 15:
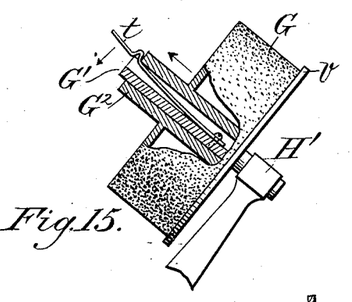
Fig. 15 is a sectional detail of the inking-roll with its fixed spindle and thumb-latch.
Figure 16:
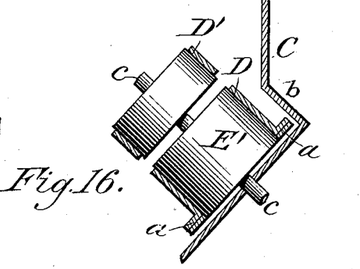
Fig. 16 is a cross-sectional view of the inclined bands and a portion of the hopper with its internal lip or flange.

The inking-roll G may be detachably held on its spindle by a thumb-latch, $t$, or similar device. In Fig. 15 the roll G is shown detachably mounted on its fixed spindle G' by means of an elongated hub, $G^2$, with which said roll is provided. On the upper side of the spindle G' is a longitudinal groove in which the thumb-latch $t$ is secured. This thumb-latch is simply a strip of spring metal having a shoulder, bend, or projection near its outer end, which normally bears against the end of the hub $G^2$, and prevents the roll G from becoming displaced during its rotation. By pressing the end of the latch $t$ downward, the inking-roll can be readily detached. This inking-roll may have a surface of felt or other suitable material. On one side or edge of the inking-roll G is a steel tread, $v$, that projects slightly beyond the surface of the roll and bears on a tread, $w$, that is formed on the printing-cylinder.

The cylinder F (which I have designated indifferently as the "type-cylinder," "printing-cylinder," or "postmarking and canceling cylinder") is provided near one edge with a tread, $w$, for the inking-roll G, and also with letter-carrying treads $y\ y$, one of which is formed upon or attached to each edge. The treads $y\ y$ project slightly beyond the tread $w$ and extend around the cylinder F, except at the portions of its periphery occupied by the postmarking and stamp-canceling dies, which themselves continue the tread.

Figure 10:
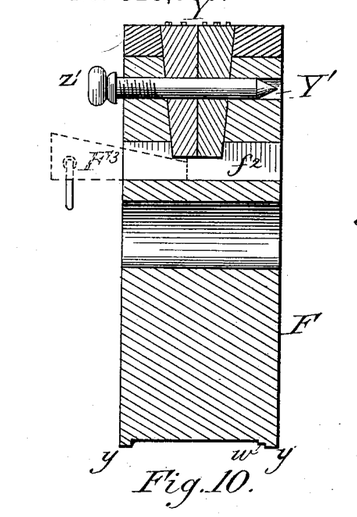
Fig. 10 is a transverse section of the type-cylinder, showing the manner of removably securing the type.
Figure 11:
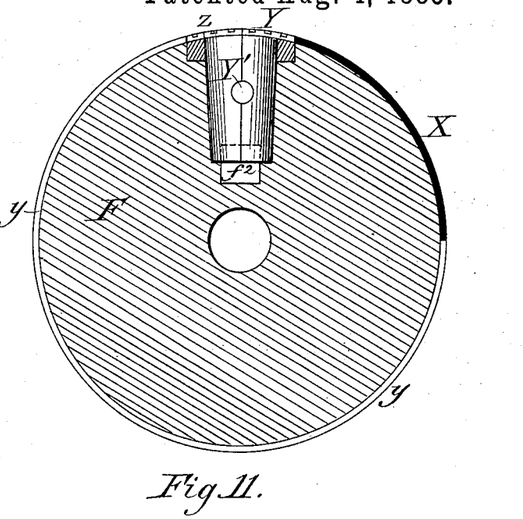
Fig. 11 is a longitudinal section of the type-cylinder.
Figure 12:
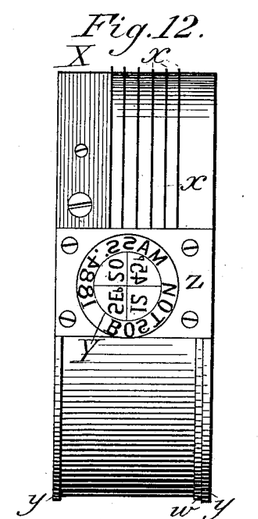
Fig. 12 is a face view of the same.

A detachable stamp-canceling die, X, and a detachable postmarking-die, Z, are carried by the cylinder F, as shown in Figs. 10, 11, and 12.

The steel canceling-die X is formed with a series of parallel lines $x\ x$, that occupy a space of sufficient length and width to insure the proper cancellation or obliteration of a series of stamps attached to the letter-envelope. This form of die also renders the cancellation certain, even if the postage-stamp on the envelope is not accurately placed. Being detachable, the die may be readily replaced when worn.

Figure 13:
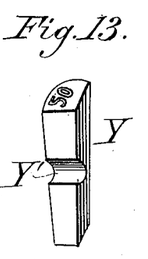
Fig. 13 is a perspective view of one of the type.
Figure 14:
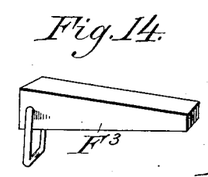
Fig. 14 is a perspective view of the type-lifting wedge.

The steel postmarking-die Z is also detachable, and is provided with a circular aperture for receiving the quarter-sectional type Y, Fig. 13. Around the circular aperture in the die Z are delineated the year and post-office name, while each type bears a portion of the letters and figures required to indicate the month, day, and hour of mailing. These type are made somewhat tapering or wedge-shaped, and each is provided on one of its plane faces with a transverse notch or groove, Y', all of which together form a circular opening for the passage of a locking-pin, Z', by which the type are secured to the cylinder F in a tapering recess that forms a continuation of the circular aperture in the face of the postmarking-die. The pin Z' is preferably threaded for a short distance near its head to prevent its working loose. The lower portion of the type-receiving recess in the cylinder F is traversed by a transverse rectangular opening, $f^2$, for the passage of a wedge, $F^3$, Fig. 14, by which the type are dislodged after the locking-pin Z' has been withdrawn.

In all large post-offices vast quantities of mail matter are deposited generally near the time for closing the mails, and, in order to prevent an accumulation of such matter and facilitate rapid mails, it is desirable to cancel the postage-stamps and apply the proper postmark with speed and accuracy. It is well known that the work of canceling and postmarking letters by hand is comparatively slow and laborious, the impression besides being often so imperfect that it is difficult to read the postmark.

By my improved machine all the manual labor of stamping is avoided and effective means provided for accurately locating the cancellation and postmark in less time than is ordinarily required for picking up and facing letters for the hand-stamp process. The machine having been put in motion by steam or other power, the operator, as fast as he can pick up the letters from the facing-table, is required only to drop them separately into the hopper C, face upward and with the stamps all in the same relative position. The inclined moving support or bands D D', that receive the letters, also accomplish their uniform alignment by reason of the projections *a a* on the lower edge of the lowermost band in conjunction with the lip *b* in the hopper. Letters, cards, and packages of various thicknesses and of unequal length and breadth, will thus be adjusted and conveyed successively and without friction over the letter-elevating guide *d* to the timing-lever *e*, where each piece of mail matter is temporarily stopped. When the postmarking-cylinder F has rotated in an elevated position to a predetermined point, its attached clamping-feet I I will grasp the letter that rests against the timing-lever *e* and convey it past said lever and over the controlling-lever *k*, which is consequently depressed, thereby moving the lug *h* into the notch *h'*, and enabling the cylinder F to descend and make its impression with accuracy and distinctness. When the clamping-feet I I descend upon the forward end of the letter, its rear end is prevented from rebounding by the spring-guide *c*, that is suspended from above. The postmarking and stamp-canceling impression having been made by and between the pressure-roll E and type-cylinder F, the upward movement of the cylinder under the rotation of the cam F² prevents a deposit of ink on the bands D D' after the postmarked letter has been discharged onto the incline L', whence it is propelled along the tray L to the ordinary sorting-table by means of the cams M, as before explained.

It is obvious that this manner of handling mail matter for postmarking, stamp-canceling, and distribution will result in greatly reducing the time hitherto required for making up the mails, besides effecting a great saving in the labor of accurate and legible stamping, either by hand or machinery, as hitherto practiced.

It will be observed that the printing-cylinder F is so mounted in the oscillating frame as to be normally out of the path of movement of the mail matter, while the lever *k* is normally in said path, and is so connected with said oscillating frame by intermediate mechanism as to be capable of controlling the descent of the printing-cylinder or stamp. This combination of devices, however, I do not herein claim broadly, as such is the subject-matter of a separate application for patent filed by me January 6, 1885, Serial No. 152,162.

Having thus described my invention, what I claim as new, and desire to secure by Letters Patent, is—

1. In an apparatus for stamp-canceling, postmarking, and like purposes, an inclined moving support for the letters, cards, or other mail matter to be acted upon, said support being provided on its lower edge with projections for automatically adjusting or aligning the several letters, cards, or other pieces, substantially as described.

2. In a postmarking and stamp-canceling apparatus, a hopper or receptacle having one side formed by a moving inclined support, provided on its lower edge with projections, as *a*, adapted to receive and align the several letters or other pieces of mail matter and convey them, consecutively, to the printing and canceling mechanism, substantially as described.

3. In a stamp-canceling, postmarking, or other printing machine, the combination of an inclined moving support for aligning and conveying the letters or other articles to be printed, an automatically-adjustable printing-cylinder, an impression-roll, a timing-lever controlled separately by each letter, card, or other piece to be marked or printed, and mechanism, substantially as described, for conveying each letter separately past the timing-lever, whereby the impression of the printing-dies is made with accuracy and at the proper points, substantially as described.

4. The combination of the inclined traveling bands, adapted to support and adjust letters, cards, or like objects placed thereon, an elevating-guide arranged between said bands, a pressure-guide suspended above said bands, a timing-lever, an adjustable printing-cylinder, an impression-roll, and mechanism, substantially as described, for conveying each letter or other article past the timing-lever at intervals, substantially as described.

5. The combination of an inclined moving support for letters, cards, and like objects, an automatic printing mechanism, a delivery table or tray, and a series of cams adapted to propel the letters, cards, or similar articles in a continuous line along said delivery-table, substantially as described.

6. The combination, with a printing-cylinder, an impression-roll, and a moving support for letters or cards, said cylinder, roll, and moving support being arranged in an inclined position, of a hopper having one side inclined at an angle with the moving support and provided with an internally-projecting horizontally-inclined lip or flange, *b*, substantially as described.

7. The combination, with the inclined bands D D', having projections *a a*, of a spring-pressure arm or guide, *c*, substantially as described.

8. The combination, with the inclined bands D D', having projections *a a* and the suspended timing-lever *e*, of a letter-elevating guide, *d*, projecting up between said bands and adapted to slightly raise a card or thin package and so direct it surely to and against said timing-lever, substantially as described.

9. The combination of the inclined traveling bands, D D', a downward-projecting pivoted timing-lever, *e*, adapted to temporarily arrest the progress of each letter placed on said bands and provided with a spring, *f*, for returning it to its normal position after the letter has passed, and mechanism, as I I, for carrying each letter separately past said timing-lever, substantially as described.

10. The combination, with the movable bands D D', arranged in an inclined position and provided with projections *a a*, of the upper guide or pressure arm, c, the letter-elevating guide d, the timing-lever e, an automatically-adjustable printing-cylinder, F, and an impression-roll, E, substantially as described.

11. The combination, with the adjustable printing-cylinder F, of the pivoted clamping-feet I I, having a cam-roller, q, and spring r, the rocker-frame H, having cam K, and mechanism, substantially as described, for lowering the printing-cylinder and its frame into printing position, said mechanism being actuated by the letter or card about to be marked or printed, substantially as described.

12. The combination, with the rocker-frame H, shaft F', and printing-cylinder F, of the friction-roller f' and the cam F² on the cylinder-shaft, whereby the rocker-frame and printing-cylinder are automatically raised, substantially as described.

13. The combination of the rocker-frame H, the arm H', carrying a spindle, G', the inking-roll G, mounted loosely on said spindle, the printing-cylinder F, mounted rigidly on a shaft, F', journaled in the rocker-frame, and the spring m', for holding the inking-roll and printing-cylinder in frictional contact, substantially as described.

14. The combination, with the printing-cylinder F, having steel treads w and y y, of the inking-roll G, having a steel tread, v, substantially as described.

15. The combination, with the printing-cylinder F, having a radial recess for movable type and a transverse rectangular opening, f², of a perforated steel die, Z, and type Y, the bases of which project into said opening and are secured by a pin, Z', whereby the type may be dislodged by inserting a wedge in the opening f² after the locking-pin has been withdrawn, substantially as described.

16. The combination, with the inclined impression-roll E and the inclined traveling bands D D', having projections a a, of an inclined printing-cylinder carrying detachable postmarking and stamp-canceling dies, substantially as described.

17. The combination, with traveling bands D D', having projections a a, the impression-roll E, and the printing-cylinder F, said bands, roll, and cylinder being arranged in a laterally-inclined position, of a stationary and horizontal tray, L, having at one end an incline, L', substantially as described.

18. The combination, with the tray L, having one end provided with a slotted incline, L', of the cams M M, adapted to pack letters and cards delivered on the incline by the printing mechanism and propel them along the tray to the sorting-table, substantially as described.

19. The combination, with the tray L, having an incline, L', provided with slots L², of the yielding support N and the cams M, having stocks M' and curved elastic fingers M², substantially as described.

In testimony whereof I affix my signature in presence of two witnesses.

MARTIN V. B. ETHRIDGE.

Witnesses:
C. F. BROWN,
H. BROWN.